J. HORTON.
Lamps.
No. 6,094. Reissued Oct. 20, 1874.
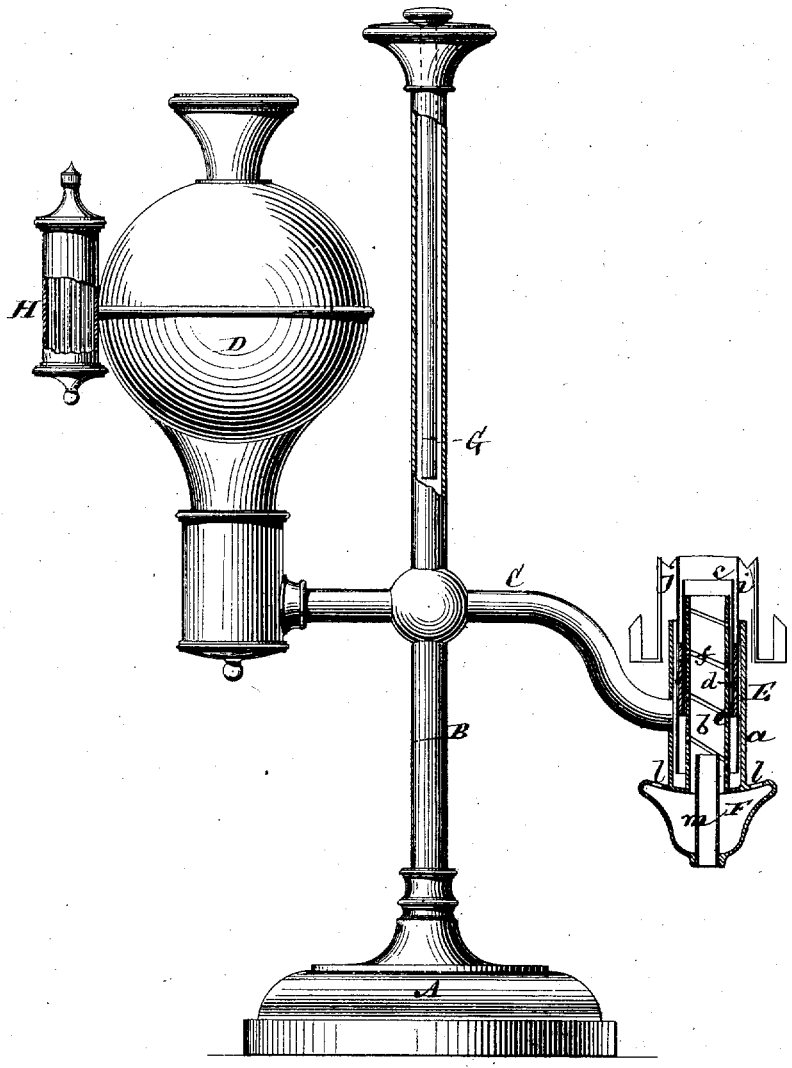
Inventor,
John Horton Assee to
P. P. Schneider
by his Attorney
Brown & Allen
Witnesses:
Michael Ryan
Fred. Haynes
THE GRAPHIC CO. PHOTO-LITH. 39 & 41 PARK PLACE, N.Y.

UNITED STATES PATENT OFFICE.

JOHN HORTON, OF NEW YORK, N. Y., ASSIGNOR TO BENNETT B. SCHNEIDER, OF SAME PLACE.

IMPROVEMENT IN LAMPS.

Specification forming part of Letters Patent No. 98,264, dated December 28, 1869; reissue No. 6,094, dated October 20, 1874; application filed September 22, 1874.

*To all whom it may concern:*

Be it known that JOHN HORTON, of the city, county, and State of New York, invented an Improvement in Lamps, of which the following is a specification:

This invention relates to argand-lamps, or, rather, to such descriptions or constructions thereof as admit of access to the burner from below, substantially as hereinafter described. The invention generally consists in a certain construction of the drip-cup of the burner, whereby the wick may be lighted by introducing a taper or torch up into and through the body of the burner from the under side of the same, so that the necessity of removing the glass chimney and shade is entirely obviated and a free supply of oxygen is or may at all times be supplied to the burner. Said invention will here be shown as applied to a student's lamp, in which an elevated fountain or reservoir to supply the flame with oil under static pressure is used; and the invention, furthermore, consists in providing a convenient place in the lamp for the reception, when not in use, of the taper or torch, hereinbefore referred to.

The accompanying drawing represents a side sectional elevation of my invention as applied to a student's lamp.

A represents the base, which supports the lamp, and B is a rod, securely fixed centrally in the base, on which rod the tubular arm C is allowed to slide freely up and down, so that it may be secured at any desired point on the rod by a set-screw. One end of this arm C is connected to and communicates with the oil fountain or reservoir D, and the opposite end is attached to and communicates with the burner E, which is constructed on the argand principle. The arm C is so curved or bent, or the fountain or reservoir has such an elevation, that the oil within the latter will be fed to the lamp-wick until the fountain or reservoir is entirely empty. The burner E is composed of an outer cylindrical shell, *a*, having within it a concentric tube, *b*, permanently secured at its lower end to the bottom of shell *a*, the tube *b* being sufficiently smaller than *a*, to admit of a requisite space between *a* and *b* to form an oil-supply chamber for the wick *c*, which encompasses tube *b*, the wick *c* being attached at its lower end to a thimble, *d*, which is fitted on tube *b*, and has a spiral slot cut in it to form a lip, *e*, to fit into a sunken screw-thread, *f*, on *b*. The thimble *d* is provided with a lateral projection, which passes into a vertical slot made in a tube, *i*, attached permanently to the upper portion *j* of the burner, the tube *i* passing down into the chamber or space between *a* and *b*, and provided with holes to admit of the oil coming in contact with the wick. By turning the top *j* of the burner the wick is raised and lowered to regulate the height of the flame.

The parts above described are old, and, therefore, do not comprise a part of this invention, but are merely referred to for the purpose of more clearly explaining the application of the invention.

F represents the drip-cup, designed to receive the overflow of oil from the tops of the tubes *b* and *i*. This drip-cup is perforated with holes *l* at its top, all around near its edge, and it is screwed upon the lower end of shell *a* so as to receive all drip from the exterior of *a*, and also all that which passes down within *b*, the oil which passes down within the latter following, of course, the sides of the same. Within the drip-cup F there is a fixed tube, *m*, open at the top and bottom, and having its lower orifice through the bottom of the cup. This tube *m* extends upward a short distance above the level of the top of the cup and within tube *b*, as clearly shown in the drawing, and is sufficiently smaller in diameter than *b*, to avoid the drip that passes down the inner side of *b*. The tube *m* is one of the principal features of this invention, and admits of important results being attained—to wit: A taper or torch may be inserted up through the tube *m* into and above the top of the wick *c*, so that the latter may be lighted without removing the glass chimney and shade, and, further, admits, in case the cup F becomes filled with oil up to the holes *l*, of a requisite supply of oxygen passing up through *m* to supply the flame.

The ordinary drip-cup having no internal tube *m*, the flame is dependent for its supply of oxygen through the holes *l*, and in the event of the latter being cut off, or sealed by an excess of oil in the cup, a not uncommon contingency, the smoking of the flame is an inevitable result.

The taper or torch designated by G, when not in use, is inserted in the upper part of the rod B, the upper part of B being tubular, as shown in the drawing. This is a very convenient place for it, and it may be very readily drawn out for use and readily inserted after use.

To the side of the fountain or reservoir D there is attached a match-box, H, to hold the matches for lighting the taper or torch.

What is claimed is—

1. The drip-cup F of an argand-burner, provided with an internal tube, *m*, substantially as and for the purpose or purposes herein set forth.

2. The combination of the torch or taper G, with the hollow standard or rod B, of an argand-lamp, constructed essentially as shown and described.

BENNETT B. SCHNEIDER.

Witnesses:
HENRY T. BROWN,
FRED. HAYNES.